Figures 1, 2:
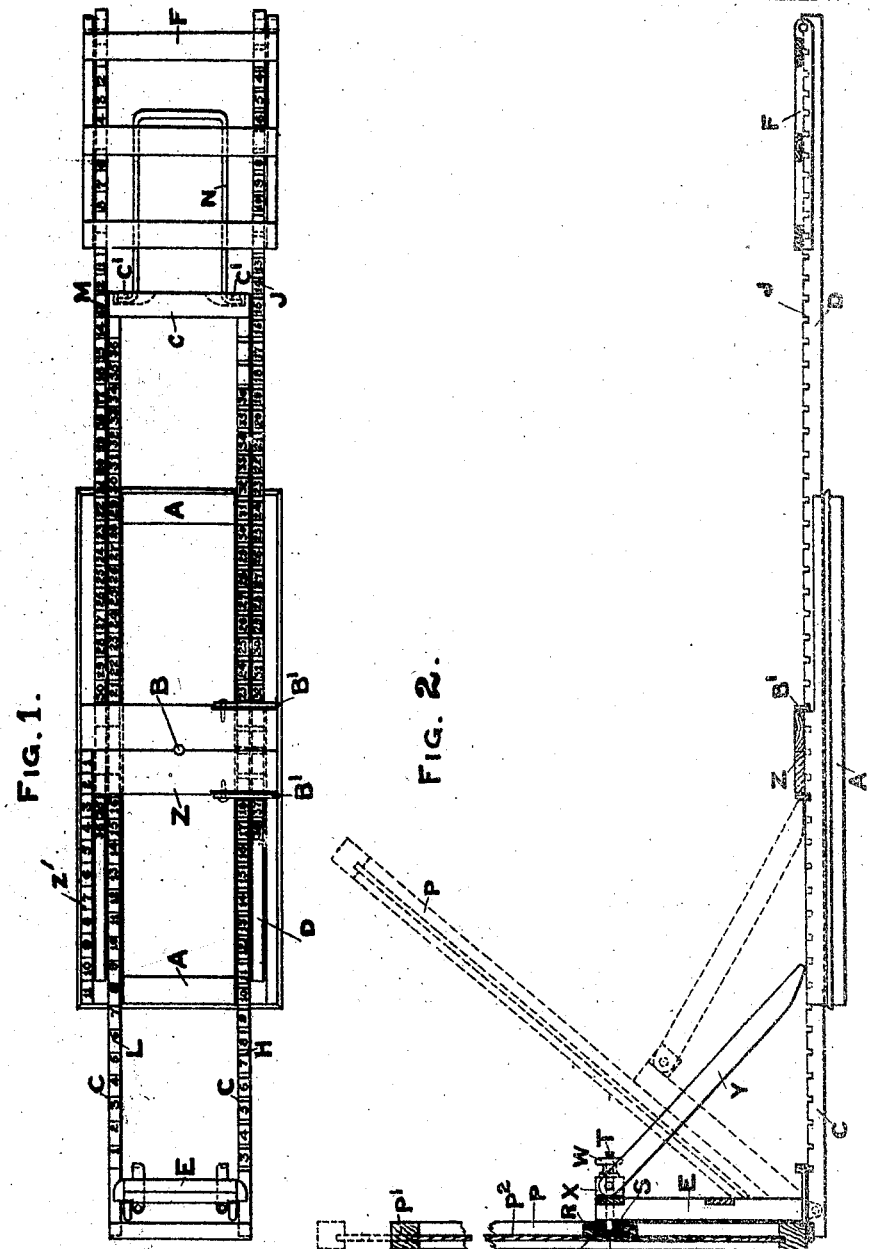

No. 872,433. PATENTED DEC. 3, 1907.
A. J. LAMBERT & C. H. LAND.
PHOTOGRAPHIC STAND.
APPLICATION FILED JAN. 4, 1907.

5 SHEETS—SHEET 1.

WITNESSES
Abu Reed
Wilfred Alderson

INVENTORS
Arthur James Lambert
Charles Henry Land
per John Welsh
Attorney

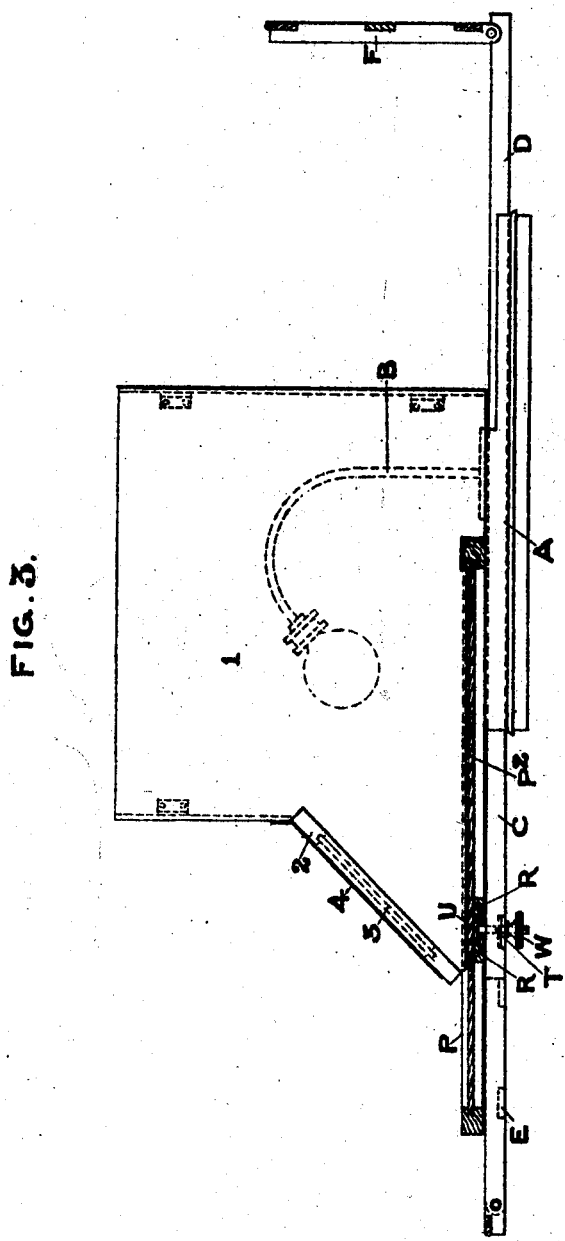

No. 872,433. PATENTED DEC. 3, 1907.
A. J. LAMBERT & C. H. LAND.
PHOTOGRAPHIC STAND.
APPLICATION FILED JAN. 4, 1907.
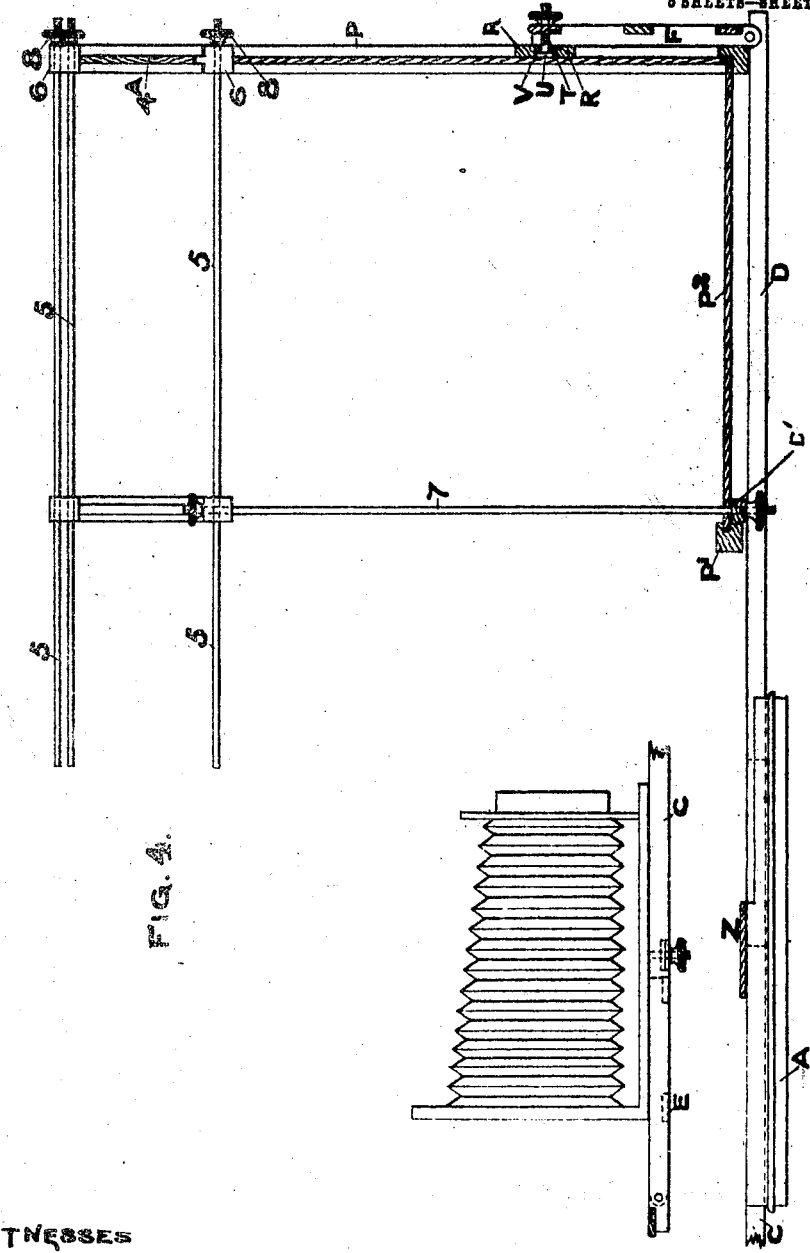

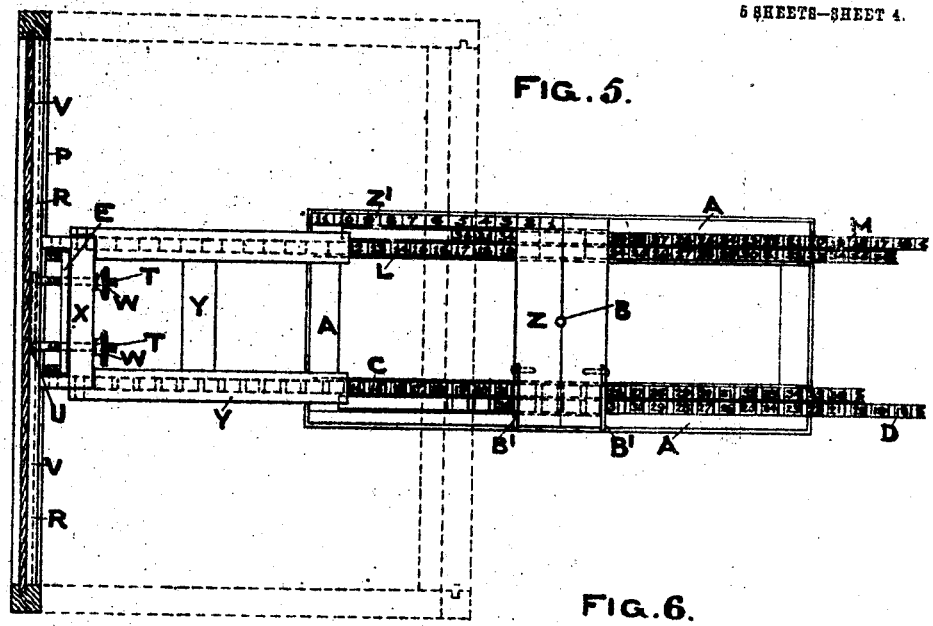
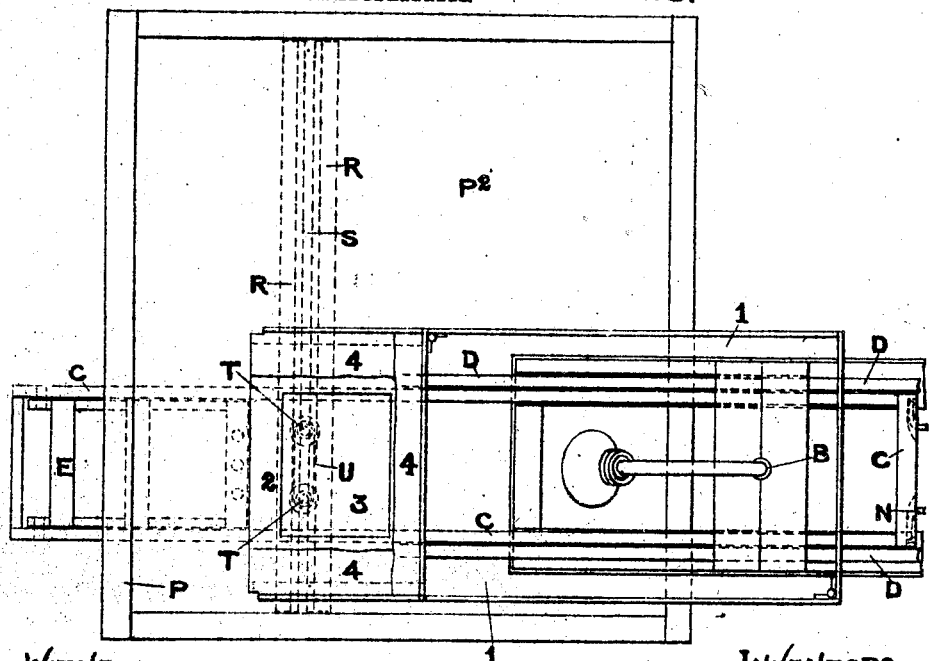

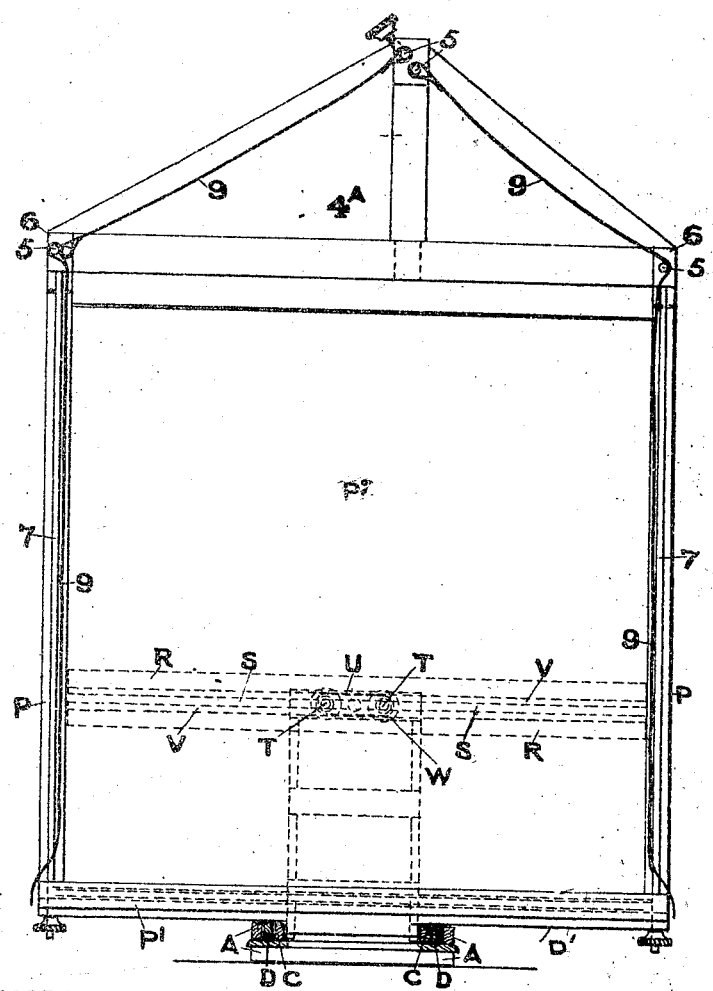

UNITED STATES PATENT OFFICE.

ARTHUR JAMES LAMBERT AND CHARLES HENRY LAND, OF BRADFORD, ENGLAND.

PHOTOGRAPHIC STAND.

No. 872,433.      Specification of Letters Patent.      Patented Dec. 3, 1907.

Application filed January 4, 1907. Serial No. 350,732.

*To all whom it may concern:*

Be it known that we, ARTHUR JAMES LAMBERT, surgeon, and CHARLES HENRY LAND, optician, subjects of the King of Great Britain, residing at Bradford, in the county of York, England, have invented certain Improvements in Photographic Stands, of which the following is a specification.

This invention relates to a photographic stand and its equipment of easels, retouching desks or light screens, and studio, employed in bromid printing, for enlarging, reducing, or copying photographs, or for artistically lighting and modeling flowers, fruit, or other small still life studies.

The object of our invention is to manufacture such stand and its equipment in a cheap and portable form, to fold up and occupy the minimum of space, be convertible and adaptable to the several uses attached to or necessary in the production and finishing of photographs as aforesaid. Also when printing or copying photographs, in addition to ascertaining and registering the distance between the source of light or illuminant and the negative, we are able to ascertain and register the distance between an object placed upon the support or at any point on the stand, and the lens of the camera or similar apparatus fixed upon another part of the stand, and further to enable all focusing movements to be undertaken by the operator from behind the camera. We attain these objects by the apparatus illustrated in the accompanying drawings, in which—

Figure 1 is a plan view of a photographic stand with our improvements applied. Fig. 2 is a side view of Fig. 1 showing our improved easel secured to folding support and again in dotted lines with easel adjusted so as to serve as a desk or board. Fig. 3 is a side view of stand shown at Fig. 1 with easel fixed in a horizontal position upon said stand, with our improved folding light screen supporting retouching desk. Fig. 4 is a side view of stand shown at Fig. 1 with portable studio secured at one end of one slide, and camera upon the folded support on the other slide. Fig. 5 is a plan of Fig. 2. Fig. 6 is a plan of Fig. 3. Fig. 7 is a sectional end view of Fig. 4.

Similar letters of reference refer to similar parts throughout the several views.

Our photographic stand consists of a base frame or slide A carrying the source of light B. Upon this frame slide two telescopic frames C, D, each sliding frame is movable towards or away from the center of frame A, and carries folding supports E, F, at one end of each frame C D. These frames C D are provided with overlapping parallel bars which slide between the base A and a crossbar Z secured above the middle part of the said base and carrying the source of light B. One of the sides of each sliding frame is notched at the top and marked with a graduated scale of inches or distances commencing at the folding frame end of each, and preferably on the side nearest the operator, see Fig. 1. By this scale the position or distance of the printing frame from the light can be noted and registered.

Small pivoted stops or catches B' are provided, pivoting upon a portion of the base frame, the one on the right engages with the notches J in the larger or outside frame D, while the one on the left engages with the notches H in the inner frame C, these stops or catches B' rigidly hold the said frames C, D, in position when in use.

A printing frame, easel, or the like may be secured to one or other of the supports E, F, either in a vertical, horizontal, or inclined position, according to the purpose for which it is required.

Upon the opposite sides of the sliding frames to the notched scales H, J, we set out and mark an additional scale L, M, in inches commencing at the folding supports. With the use of this scale it may be calculated and ascertained by deduction from the distance indicated on the notched scale, the distance between an object placed upon the support E or F or at any other position upon the stand, and the lens of the camera or the like placed upon another part of the stand. This information cannot be ascertained by reference to the notched scales, as they only indicate the distance of the object from the source of light or the center of the base frame. It is also advisable and preferential to accomplish all focusing movements from behind the camera, therefore in order to increase the range and focus up to the extreme limit of each sliding frame, we employ a suitable spring detachable handle N, whose cranked extremities are made to fit within suitable recesses or the like formed in one end of the inner sliding frame C and behind plates C' attached to said frame. The handle N forms an extension of one end of the slidable frame which permits the said frame to be operated from a distance. Hitherto to move the said frame beyond the end of the base frame A, the former had to be adjusted from the opposite end or in front of the camera, and this method greatly retarded the operation of focusing.

As part of the equipment of the aforesaid photographic stand, we employ a suitably constructed easel P adapted to many uses and constructed of the usual rectangular frame with grooved inner edges, one side P' of which with the body P² is detachable, see dotted lines at Fig. 2. Two stretchers R a suitable distance apart are secured transversely across the easel at the back. The space S between these stretchers serves as a slot within which are two screwed bolts T projecting from a plate U fitting within a corresponding groove V between the back of easel and the transverse stretchers, and running parallel with the same. When the easel is required in a vertical position to form a back ground, these bolts project through corresponding holes in the folding support E or F, and the easel is secured in position by thumbscrews W. When required as a desk, the aforesaid bolts T project through both support and a cross piece X upon which hinges one end of a quadrangular frame or leg Y, see Fig. 2. The easel is pushed over until the quadrangular frame abuts against the crossbar Z of the base frame A. To obtain the desired angle the sliding frame C is moved further in or out, as required.

When employing a retouching desk we secure the easel P by any approved means in a horizontal position upon one of the sliding frames, see Fig. 3, and make the same serve as a table upon which is mounted the retouching desk and light screen. The light screen 1 is portable and made in two parts, each part forming one side and one end of the screen, the end portions are hinged to the side portions, and the whole are secured by suitable fasteners. One end of this screen has an inclined frame 2 within which is mounted the usual retouching desk 3, suitable overhanging cloths 4 surround the said desk and prevent the passage of light at the edges of the picture when the picture does not wholly cover the desk.

When it is desired to artistically light or model flowers, fruit, or other small still life studies, we construct a small studio and fix the same upon one or other of the sliding frames C, D. In constructing this studio we employ two of the aforesaid easel boards P², one we secure in manner and by means before described in a vertical position, this forms part of the back of the studio, the second easel board we place upon the sliding frame D in a horizontal position with one end abutting against the vertical easel, and the other end resting upon a suitably shaped cross piece D' mounted upon the frame D, this horizontal easel board serves as the floor of the studio. The back has an upper portion 4ᴬ fitted to it, this addition is reversible and so shaped that the studio may receive light from either side. Horizontal rods 5 project from this back part through a framework 6 supported by vertical rods 7 from the floor of the studio, these horizontal rods 5 are secured in position by thumbscrews 8 and serve to support the cloth screens 9 forming the roof and sides of the studio. The camera is fixed upon the other sliding frame C and the focusing done from behind the camera.

The scale Z' upon the stand A is for enlarging purposes, and in order that when the enlarging lantern is centrally situated upon the latter, the distance the lens projects beyond the center or source of light may be noted, and said distance deducted when adjusting the sliding frame C for the aforesaid purpose.

What we claim as our invention, and desire to secure by Letters Patent, is—

1. In a photographic stand, the combination, with a base, of two telescopic frames provided with overlapping parallel bars slidable in the said base and projecting at opposite ends of it, and supports for photographic apparatus pivoted to the end portions of the said frames.

2. In a photographic stand, the combination, with a base, of two telescopic frames provided with overlapping parallel bars slidable in the said base and projecting at the opposite ends of it, catches pivoted to the said base and locking the said frames in position, and supports for photographic apparatus pivoted to the end portions of the said frames.

3. In a photographic stand, the combination, with a base, of two telescopic frames slidable in the said base and projecting at opposite ends of it, a detachable handle of spring metal which forms an extension at one end of one of the said frames, and supports for photographic apparatus pivoted to the end portions of the said frames.

4. In a photographic stand, the combination, with a base, and a crossbar secured above the base for supporting a source of light, of two telescopic frames provided with overlapping parallel bars slidable between the said base and crossbar, and supports for photographic apparatus pivoted to the end portions of the said frames on opposite sides of the said crossbar.

5. In a photographic stand, the combination, with a base, and a crossbar secured above the base for supporting a source of light, of two telescopic frames provided with overlapping parallel bars slidable between the said base and crossbar, and supports for photographic apparatus pivoted to the end portions of the said frames on opposite sides of the said crossbar, said parallel bars being provided with graduations for indicating the distance between the said source of light and the said supports.

6. The combination, in photographic stands provided with telescopic frames C, D, of graduated scales L, M, upon the sides of such telescopic frames opposite to the notched scales H, J, and a detachable spring handle N for operating said frames from behind the camera, for the purposes set forth.

In testimony whereof we affix our signatures in presence of two witnesses.

ARTHUR JAMES LAMBERT.
CHARLES HENRY LAND.

Witnesses:
ABM. REED,
WILFRED ALDERSON.